July 1, 1958
S. B. HUTCHINS
2,840,904
POWER DRIVEN TRIMMER MOTOR MOUNTING MEANS
Filed July 29, 1957
2 Sheets-Sheet 1
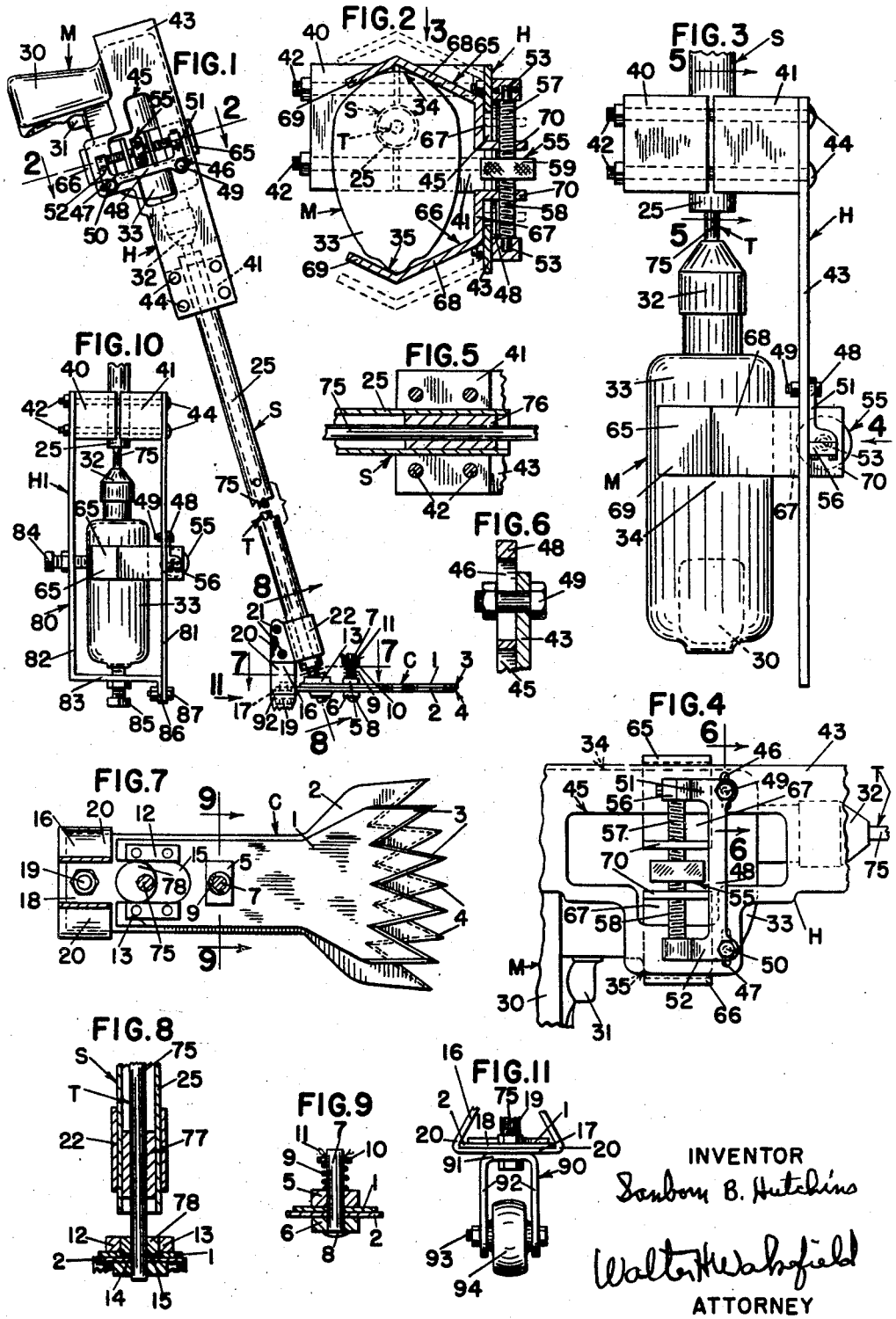
INVENTOR
Sanborn B. Hutchins
Walter H Wakefield
ATTORNEY

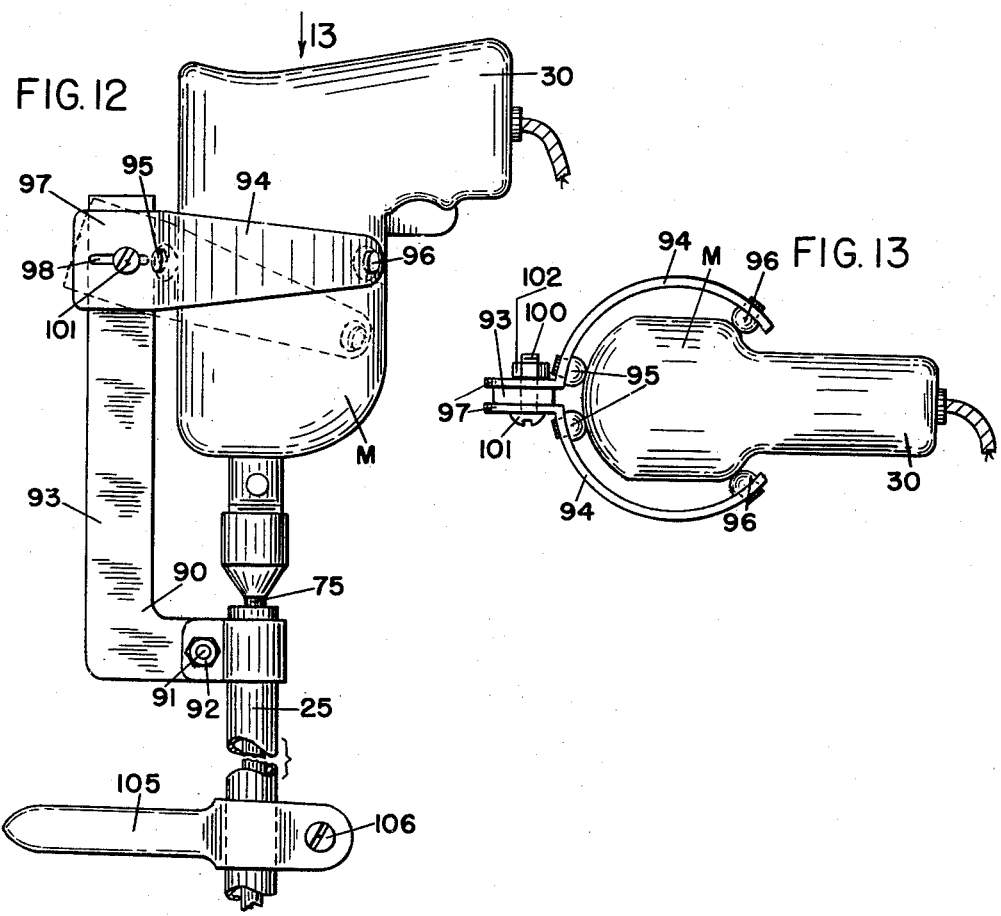

United States Patent Office 2,840,904
Patented July 1, 1958

2,840,904

POWER DRIVEN GRASS TRIMMER MOTOR MOUNTING MEANS

Sanborn B. Hutchins, Holden, Mass., assignor to Hutchins Mfg. Inc., Holden, Mass., a corporation of Massachusetts Application July 29, 1957, Serial No. 674,934

17 Claims. (Cl. 30—210)

This is a continuation-in-part of my copending application Ser. No. 485,221, filed Jan. 31, 1955.

This invention relates to grass clippers adapted more especially for trimming grass around walks and in areas not accessible to lawn mowers and it is the general object of the invention to provide an easily manipulated cilpper which is operated by a motor located at the upper end thereof within convenient reach of the user.

It is an important object of the invention to provide a grass clipper driven by a motor which is readily attachable to and detachable from the clipper so that it can be used for other purposes.

It is a further object of the invention to provide a grass clipper having certain parts permanently connected to each other but providing mounting means for attaching any one of several types or designs of motors to the other parts by an adjustable holder which can be changed easily in accordance with the shape of a particular motor to align the axis of the motor or external part which it drives with the axis of the shaft which operates the lower movable grass cutting member of the clipping unit. As an example, several designs of electric hand drills are available differing slightly in over-all dimensions and the aforesaid mounting means is so made that it can be fitted to these various designs.

Although the aforesaid mounting means is adjustable to different designs of power driven hand tools it is contemplated that the possessor of a clipper made as set forth herein will use the same power unit whenever using the clipper and it is a further object of the invention to provide a mounting means which after adjustment for a particular power tool or unit will have parts of its structure fixed with respect to the clipper but will have another part which can be quickly released or tightened to permit removal or attachment of the motor unit to the clipper with assurance that the motor unit will always be correctly aligned with the power transmitter for the movable cutter member of the clipping unit.

It is a further object of the invention to provide an improved form of motor mounting means comprising a holding unit including in its construction a side plate or the like extending more or less parallel to the operating shaft and having on one side thereof a carrier on which is rotated and mounted a screw element having right and left-hand screw threads for cooperation with two holding arms which move apart or toward each other depending upon the rotation or direction of the screw element. The holding arms pass through an opening in the plate to grasp the motor unit on the other side of said plate. The carrier is held in a transversely adjusted position with respect to the plate so that the holding arms can be moved with respect to the axis of the shaft. In order that the holding arms may be reenforced it is the further object to make them in such form that parts of them will slide along the side plate and engage the latter when they are clamped tightly to the motor unit.

A modified form of the invention utilizes a somewhat simpler holder for the motor wherein the latter is held by arms preferably equipped with rubber pads to avoid scratching of the motor and also frictionally hold the motor to the holder. The arms are preferably resilient to enable them to fit motors of slightly different shapes.

In order that the invention may be clearly understood reference is made to the accompanying drawings which illustrate by way of example three embodiments of the invention and in which:

Fig. 1 is a side view of a motor mounting means made according to the preferred form of the invention, Fig. 2 is an enlarged transverse section on line 2—2, Fig. 1, Fig. 3 is a plan view looking in the direction of arrow 3, Fig. 2, Fig. 4 is a view looking in the direction of arrow 4, Fig. 3, parts being broken away, Fig. 5 is a fragmentary longitudinal section on line 5—5 Fig. 3, Fig. 6 is a detail transverse section on line 6—6, Fig. 4, showing part of the mounting means for the motor unit, parts being broken away, Fig. 7 is an enlarged horizontal section on line 7—7, Fig. 1, Fig. 8 is an enlarged detail longitudinal section on line 8—8, Fig. 1, Fig. 9 is a detail transverse section on line 9—9, Fig. 7, Fig. 10 is a view similar to Fig. 3 on reduced scale showing a modified form of mounting means, Fig. 11 is a detail on an enlarged scale looking in the direction of arrow 11, Fig. 1, showing a roller or wheel which can be used to facilitate movement of the clipper along the ground or walk, Fig. 12 is a plan view of a second modified form of the invention, parts being broken away, and Fig. 13 is an end view looking in the direction of arrow 13, Fig. 12, parts being omitted.

The grass cutting or trimming unit C includes upper and lower cutter members 1 and 2, respectively. The member 1 moves with respect to the lower member 2 and has teeth 3 related to teeth 4 on member 2 as shown in Fig. 7. Members 1 and 2 have bearings 5 and 6, respectively, through which passes a pivoted stud 7 having a head 8 on its lower end, see Fig. 9, and having its upper end surrounded by a compression spring 9 located between bearings 5 and a washer 10 limited as to upward movement on the stud by a cotter pin 11. Any other convenient form of pivoted connection between the members can be used.

Cutter member 1 has two parallel spaced blocks 12 and 13 secured thereto. The lower member 2 has a bearing 14 fixed thereto and the upper member 1 has a slot 15 therein shaped as shown in Fig. 7.

The cutter unit C is held to the clipper or trimmer by the means shown in Figs. 1, 7 and 8 including a brace 16 made preferably of sheet metal having a flat bottom 17 held to an extension 18 of member 2 by a bolt 19. The brace has two sides 20 engaging the sides of extension 18 and bent toward each other and then extending upwardly against each other to be held by screws 21 to a clamp strap 22 made preferably of sheet metal, see Fig. 1. The cutter member 2, the brace 16 and the clamp 22 are thus secured together in fixed relation.

The support or connector unit S is shown herein as a pipe or tube 25 to the lower end of which the clamp is securely held by screws 21. Unit S need not necessarily be a pipe, but it should be rigid and preferably so shaped as to protect the power transmiter T.

At the upper end of the support unit is the motor unit M which is shown here as an electric power drill having a handle 30, a switch closer 31, and a chuck 32. The electric motor of unit M, not specifically shown herein, is inclosed within a housing or casing 33. A large variety of differently shaped hand drills are available having casings similar to casing 33 but differing somewhat in over-all outlines and dimensions, but many of them will have casings of the general form shown in Figs. 2, 3 and 4, that is, they will have upper and lower convexly curved surfaces 34 and 35 and these surfaces will extend lengthwise of the casing. Also, the transverse outline will generally be symmetrical, or nearly so, about a vertical central axis, as is apparent in Fig. 2.

The mounting means for the motor unit in its preferred form as shown in Figs. 2 and 3, includes a holding unit H comprising two blocks 40 and 41 clamped tightly against the upper end of pipe 25 by bolts 42. These bolts pass through a side plate 43 which is held tightly against block 41 by the heads 44 of the bolts. Plate 43 is substantially parallel to pipe 25 and is made with an opening 45 to reduce its weight. Upper and lower preferably aligned transverse slots 46 and 47, respectively, are formed in plate 43, see Fig. 4, and a carrier 48 is held to plate 43 in transverse adjusted position by bolts 49 and 50 passing through slots 46 and 47, respectively. Fig. 6 shows details of this connection for the upper part of the carrier.

The carrier has arms 51 and 52 at its upper and lower ends, respectively, which serve as bearings for trunnions 53 on the ends of screw element 55. The upper arm 51 has a cap 56 to facilitate fitting the screw element to the carrier. The upper and lower ends 57 and 58, respectively, of the screw element are provided with screw threads of opposite hand, and an enlarged knurled part 59 affords means for turning element 55 in its bearings.

Upper and lower holding arms 65 and 66 are screw threaded on the parts 57 and 58, respectively, of the screw element. By turning the latter in one direction the holding arms are caused to move toward each other, but turning of the screw element in the opposite direction causes the holding arms to move apart. Each of the holding arms has a part 67 which fits closely to but is slidable along the plate 43, and the part of each holding arm extending away from the screw element 55 is bent as shown in Fig. 2 to provide angularly disposed parts 68 and 69 which fit against adjacent parts of the casing 33. The ends 70 of the holding arms extend through the opening 45 and are screw threaded to their respective parts of the screw element, as suggested in Fig. 4.

The transmitter T is shown here as a rigid shaft 75 passing through and turnable in upper and lower bearings 76 and 77, respectively, held in the pipe 25. The upper end of shaft 75 is held firmly by the chuck 32 which is accessible for manual operation. Secured to the lower end of shaft 75 is an eccentric 78 which rotates between the blocks 12 and 13 and by its engagement with them oscillates the top cutter member 1. The slot 15 is long enough to accommodate the eccentric when the latter has made a half turn from the position in which it is shown in Fig. 7.

Preparatory to fitting the motor unit to the holder unit the bolts 49 and 50 are loosened and screw element 55 turned in a direction to move the holder arms 65 and 66 to the dotted line position shown in Fig. 2. The motor unit is then moved between these arms and the chuck 32 tightened to the upper end of shaft 75, thus centering the motor and transmitting units. Screw element 55 is then turned in a direction to move arms 65 and 66 toward casing 33, and if for instance top arm 65 should engage the casing first, continued turning of the screw element will result in upward motion of the element and carrier 48 and also of the lower arm 66 until the latter engages the bottom of the casing. During this operation the part 67 of arm 66 will slide up along plate 43. The bolts 49 and 50 are then tightened and the casing will be firmly held between arms 65 and 66 with the motor unit held fixed with respect to the support unit S and aligned with shaft 75. A similar procedure would have been followed had the lower arm 66 been the first to engage the casing 33.

If unit M is to be removed for use elsewhere, but will later be used with the clipper again, the bolts 45 and 50 are left tightened in place and the screw element turned to separate the arms 65 and 66. The chuck 32 is then released from shaft 75 and the unit can be moved endwise and then laterally, to the left in Fig. 2, for removal. When the unit M is to be used again the carrier 43 will already be in its correct position and the bolts 49 and 50 will be left tight. Thus a single adjustment of the carrier 48 will suffice for repeated applications of unit M to unit H, provided the same unit M is used.

In the first modified form of mounting means shown in Fig. 10 many of the parts already described will be used, but the holder unit H1, instead of having a single plate 43, will have a frame 80 including sides 81 and 82 and an end 83. An adjusting screw 84 in side 82 bears against the casing 33 on the side thereof opposite the screw element, and a second adjusting screw 85 in end 83 bears against the end of the casing opposite the chuck 32. The two sides 81 and 82 will be secured to each other and to the blocks 40 and 41 by bolts 42, as is apparent in Fig. 10. The right-hand part of end 83, Fig. 10, is bent at 86 to extend along the side 81, and a bolt 87 secures the side 81 and end 83 to each other. With this arrangement the side 81 can in fact be substantially the same as side plate 43.

In the second modified form of the invention shown in Fig. 12 the tube 25 has wrapped around it a support foot 90 clamped tightly to the tube by a screw 91 and nut 92. The foot 90 is integral with a flat preferably sheet metal holder unit 93 similar to plate 43. Near the end of the holder 93 opposite to the foot 90 two similar preferably sheet metal arms 94 are provided, each having secured thereto inner and outer soft rubber pads 95 and 96 respectively. These pads, to be considered as parts of their respective arms when used, face inwardly toward and engage adjacent surfaces of the motor M.

Each arm 94 is of arcuate form, see Fig. 13, and extends partly around the motor so that the two arms embrace the motor and engage it at points so located as to hold the motor aligned with the shaft 75 to which it is attached as, for instance, in the other forms. Each arm has an attaching foot 97 bent therefrom, Fig. 13, and these feet lie on opposite sides of the plate 93 and have slots transverse of the plate. A holding bolt 100 extends through the slots 98 and the plate 93 and has a head 101 to engage one of the feet 97 and a nut 102 to engage the other foot. By reason of the bolt and nut the arms 94 can be firmly clamped to the plate and be moved into close holding relation with respect to the motor.

If desired each foot 97 can be bent with respect to its arm at such an angle as will require tightening of the nut in order to hold the feet against plate 93 and the pads 96 against the motor with a close fit. The bolt can also serve as a pivot to permit one or both arms to be clamped in adjusted angular position, see dotted lines in Fig. 12, to permit the outer pads 96 to move up along a curved surface of the motor to increase their gripping effect on the motor. The slots 98 permit adjustment of the arms 94 laterally with respect to plate 93 to fit motors of slightly varying contours.

The tube 25 has a handle 105 secured thereto by screw 106 and extending in a direction opposite to that of the motor handle 30. By this arrangement the user can grip both handles for better control.

If it is desired to provide a rolling support for the clipper to facilitate its movement along the ground a structure such as shown in Fig. 11 can be used. A yoke 90 has a flat top part 91 which is held securely to the cutting unit C by the bolt and arms 92 depending from part 91 support a pin or the like 93 on which is rotatably mounted a roller or wheel 94.

In all forms of the invention an elongated support 25 with a shaft 75 therein has secured to it a holder 43, 81 or 93 on which are mounted arms 68 or 94 to engage the motor at spaced points around its periphery and screw threaded means, such as screw 55 or the bolt 100 and its nut 102 on the holder holds the arms against the motor, and enables the arms to align the motor with the shaft. Also, the screw threaded means can be released to permit removal of the motor so that it can be put to other uses.

Having now particularly described and ascertained the nature of the invention and in what manner the same is to be performed, what is claimed is:

1. In a mounting for the driving means of a grass clipper provided with an elongated support unit along which extends a shaft operatively connected to a cutter unit, a holder unit secured to said support unit, a motor unit operatively connected to said shaft, holding arms on the holding unit for engagement with opposite sides of the motor unit, and means on the holder unit operatively connected to said holding arms effective to move the latter into and out of holding relation with respect to said motor unit.

2. A mounting as set forth in claim 1 wherein the holding unit has a plate extending substantially parallel to said shaft and said holding arms extend laterally from said plate.

3. A mounting as set forth in claim 1 wherein said holding arms are supported from a carrier adjustable on the holding unit in a direction to move said holding arms toward and from the axis of said shaft.

4. A mounting as set forth in claim 1 wherein said holding arms are mounted on a screw element supported by said holding unit and rotatable relatively thereto to move said holding arms toward and from said motor unit.

5. A mounting as set forth in claim 1 wherein the holding unit includes a flat elongated plate substantially parallel to the axis of said shaft and a carrier adjustable on said plate transversely thereof supports a screw element on which the holding arms are mounted.

6. The mounting set forth in claim 5 wherein the screw element is transverse of said plate and rotation thereof causes movement of the holding arms relatively to the axis of the shaft and parts of said arms during said movement thereof slide along said plate.

7. The mounting set forth in claim 5 wherein said screw element is on one side of said plate and the motor unit is on the other side of the plate and the holding arms extend from the screw element through an opening in said plate to said other side of the plate for engagement with the motor unit.

8. In a mounting for the driving means of a grass clipper provided with an elongated support unit along which extends a shaft operatively connected to a cutter unit, a holder unit secured to said support unit, a motor unit operatively connected to said shaft, holding means on the holding unit movable relatively to the latter for engagement with the motor unit, operating means effective to move said holding means into engagement with the motor unit, and a carrier for the operating means adjustable relatively to the holding unit and secured thereto in adjusted position when the holding means are in engagement with the motor unit.

9. In a mounting for the driving means of a grass clipper provided with an elongated support unit along which extends a shaft operatively connected to a cutter unit, a holder unit secured to said support unit, a motor unit operatively connected to said shaft, holding arms on the holding unit for engagement with opposite sides of the motor unit, and means on the holder unit operatively connected to said holding arms effective to move the latter into and out of holding relation with respect to said motor unit, said holding unit including a plate on one side of the motor unit extending substantially parallel to said shaft and said holding arms extending laterally from said plate, and said holding unit including also a second plate fixed with respect to the first named plate on the opposite side of the motor unit and secured to said support unit.

10. A grass clipper drive mounting as set forth in claim 9 wherein a screw in said second plate engages the motor unit.

11. A grass clipper drive mounting as set forth in claim 9 wherein an end member for the holder unit connects said plates and a screw in said end member has a screw therein engaging the end of the motor unit opposite to the support unit.

12. In a mounting for the driving means of a grass clipper provided with an elongated support unit along which extends a shaft operatively connected to a cutter unit, a holder unit secured to said support unit, a motor unit operatively connected to said shaft, holding arms on the holding unit for engagement with the motor at points spaced therearound, and means on the holder unit effective to hold the arms in engagement with said spaced points on the motor unit to hold the latter aligned with said shaft.

13. The mounting set forth in claim 12 wherein the last named means is screw threaded and extends transversely of said holder unit.

14. The mounting set forth in claim 12 wherein the last named means is a bolt serving as a pivot around which the arms can be swung to change the points of engagement thereof with the motor unit.

15. The mounting set forth in claim 12 wherein the holder unit has a transverse slot therein and said last named means is a bolt movable along the slot to move the arms bodily with respect to the axis of the motor unit.

16. The mounting set forth in claim 12 wherein the arms embrace opposite sides of the motor unit.

17. The mounting set forth in claim 12 wherein the arms have secured thereto soft rubber pads which engage the motor unit.

No references cited.